US006825573B2

(12) United States Patent
Suzuki et al.

(10) Patent No.: US 6,825,573 B2
(45) Date of Patent: Nov. 30, 2004

(54) ENGINE GENERATOR

(75) Inventors: Misao Suzuki, Tokyo (JP); Hideki Tomiyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 136 days.

(21) Appl. No.: 10/121,083

(22) Filed: Apr. 12, 2002

(65) Prior Publication Data

US 2002/0149203 A1 Oct. 17, 2002

(30) Foreign Application Priority Data

Apr. 13, 2001 (JP) ..................................... P.2001-115621
Apr. 13, 2001 (JP) ..................................... P.2001-115625

(51) Int. Cl.[7] ................................................ H02P 9/04
(52) U.S. Cl. .................................... 290/1 A; 310/102 R
(58) Field of Search ............................ 290/1 A, 6, 4 R, 290/4 C–4 D; 123/2; 310/153, 74, 112–113, 102 R, 89

(56) References Cited

U.S. PATENT DOCUMENTS 5,118,978 A * 6/1992 Matsumoto et al. ........ 310/153
5,546,901 A * 8/1996 Acker et al. ............ 123/195 C
6,181,019 B1 1/2001 Frank
6,331,740 B1 * 12/2001 Morohoshi et al. ......... 290/1 A
6,362,533 B1 * 3/2002 Morohoshi et al. ......... 290/1 A
6,373,155 B1 * 4/2002 Shimizu et al. ........... 310/68 B
6,424,126 B1 * 7/2002 Ohsawa ......................... 322/4
6,525,430 B1 * 2/2003 Asai et al. .................. 290/1 A
6,568,355 B2 * 5/2003 Suzuki .......................... 123/2
6,624,543 B1 * 9/2003 Bankstahl .................... 310/91

FOREIGN PATENT DOCUMENTS

EP 0 612 138 A2 8/1994
JP 8-223854 8/1996 ............ H02K/5/20

* cited by examiner

*Primary Examiner*—Nicholas Ponomarenko
*Assistant Examiner*—Leda Pham
(74) *Attorney, Agent, or Firm*—Darby & Darby

(57) ABSTRACT

A flywheel, a cooling fan and a recoil starter are mounted on a crank shaft of an engine, thereby forming an engine unit. A power generating body is mounted on the end of the engine unit with the aid of an adapter intervening therebetween. The adapter and a rotor shaft are interconnected by means of a through bolt. A control system of the engine generator may be changed to an AVR type or an inverter type control system by removing the through bolt and replacing the power generating body with another. Accordingly, it is possible to provide an engine generator which allows the control system to be replaced with another type control system by easy replacing work.

14 Claims, 9 Drawing Sheets

ENGINE GENERATOR

BACKGROUND OF THE INVENTION

The present invention relates to an engine generator including an engine and a power generating body driven by the engine. More particularly, the present invention relates to an engine generator which allows a power generating body based on one control system to be replaced with another power generating body based on another control system.

An automatic voltage regulator (AVR) using a capacitor and the like has widely been used for a control system for controlling a generated voltage in a engine generator. Recently, highly accurate voltage stability and frequency characteristic are required also for the engine generator. In this circumstance, the number of engine generators each employing a control system of an inverter type is on the increase.

In the engine generator of the AVR type, a magnet of the power generating body has two poles. Accordingly, to produce electric power at 60 Hz, the engine is rotated at 3600 rmp. The control unit is relatively small in size.

On the other hand, in the engine generator of the inverter type, a rotor provided with a magnet having at least 20 poles is rotated at high speed, so that it is capable of generating higher electric power than that generated by the conventional engine generator of the AVR type. As a result, the electronic parts of the control unit are large in size, and the control unit per se is also large.

Thus, the structures of the engine generators based on both the control systems are greatly different from each other. Accordingly, even in a design of only the control units of the engine generators, it is difficult to design them so as to satisfy common specifications. For this reason, it is a general practice of the engine generator design to employ either of the control systems for its control system. Accordingly, also in production and sales stages, a manufacturer is obliged to grasp the demands of both the control systems, and then to manufacture and purchase the related merchandize. Excessive stock or shortage of merchandize in stock is likely to occur, and it is difficult to secure an optimum stock.

However, the engine generator may be categorized into two types depending on an interior structure thereof. A first type of the engine generator is structured such that, as disclose in Japanese Patent Unexamined Publication No. Hei. 8-223854, one end part of a crank shaft of the engine is used as an output shaft thereof. The power generating body is provided on the output shaft, whereas a recoil starter is provided on the other end. Namely, in this type of the engine generator, component parts are disposed on both sides of the engine. The part layout is easy in this type, so that a structure of the device is relatively simple.

A second type of the engine generator is structured such that one end part of the crank shaft is used as an output shaft thereof, and the power generating body and the recoil starter are mounted on the output shaft. This type of the engine generator is more complex in structure than the first type of the engine generator, but the whole device is made compact advantageously.

In the second type of engine generator, the number of mounting parts is large. This necessitates use of a long dedicated crank shaft. This hinders the use of the general purpose engine for the engine generator. Even when the dedicated parts are used, the flywheel and the cooling fan are mounted on the tapered part of the crank shaft, and the power generating body is mounted at a position subsequent to them. For this reason, in the power generating body mounting part, it is impossible to secure a sufficient tapered shaft diameter.

SUMMARY OF THE INVENTION

Accordingly, it is an object of the present invention to provide an engine generator which allows the control system to be replaced with another type control system by easy replacing work.

The object of the present invention can be achieved by an engine generator, according to a first aspect of the present invention, that comprises an engine generator having an engine unit with an engine, and a power generating body mounted on the engine unit and driven by the engine. An adapter to which the power generating body is detachably attached is provided between the drive unit and the power generating body so as to allow replacement of the power generating body.

In the above-mentioned engine generator, it is preferable that the adapter has a common mounting portion to which a plurality of power generating bodies are singularly mountable, the power generating bodies having control systems different from one other.

Namely, in a preferred embodiment, a power generating body based on a control system which is different from a control system of an existing power generating body is allowed to be attached to the engine unit with the aid of the adapter.

In the invention, one replaces the power generating body with another power generating body by a simple replacing work. Accordingly, whenever occasion calls, one can replace the power generating body with another power generating body, and change the product specifications to other ones. Therefore, in a specific example, one can replace a power generating body of the AVR type with another power generating body of the inverter type. Accordingly, there is no need for the alternative manufacturing and purchasing, and the invention succeeds in eliminating the excessive stock or shortage of merchandize in stock.

In addition to this, it is also an object of the present invention to provide an engine generator which allows the power generating body to be disposed on the engine output shaft without altering the engine side, such as a crank shaft.

The object can be achieved by an engine generator, according to a second aspect of the present invention, comprising an engine and a power generating body driven by the engine. A flywheel, a cooling fan driven by the engine, a recoil device for starting up the engine, and the power generating body are disposed the side of the engine having an output shaft, and arranged in this order from the engine.

In the engine generator, an adapter to which the power generating body may be attached is provided at the tip end of a crank shaft of the engine. In this case, in a structure where the flywheel is mounted on the output shaft, an adapter is mounted on the flywheel, the power generating body and the crankshaft as the output shaft are coupled with each other with the aid of the adapter.

In the invention, the component parts are thus laid out, the power generating body and the engine are both cooled by use of one cooling fan. Further, the power generating body is mounted on the output shaft with the help of the adapter. Accordingly, there is no need of using the long crank shaft exclusively used for the engine generator, and the component parts may be laid out as stated above without any alteration in the engine side. Accordingly, a general purpose engine may be applied to the engine generator without using any dedicated part for the crank shaft, and the production cost is reduced. Since the power generating body is fastened by using the adapter, a sufficient large diameter of the coupling part is secured. Those may be coupled together at sufficient strength.

DETAILED DESCRIPTION OF THE PREFERRED EMBODIMENTS

The preferred embodiments of the present invention will be described with reference to the accompanying drawings.

Figure 1:
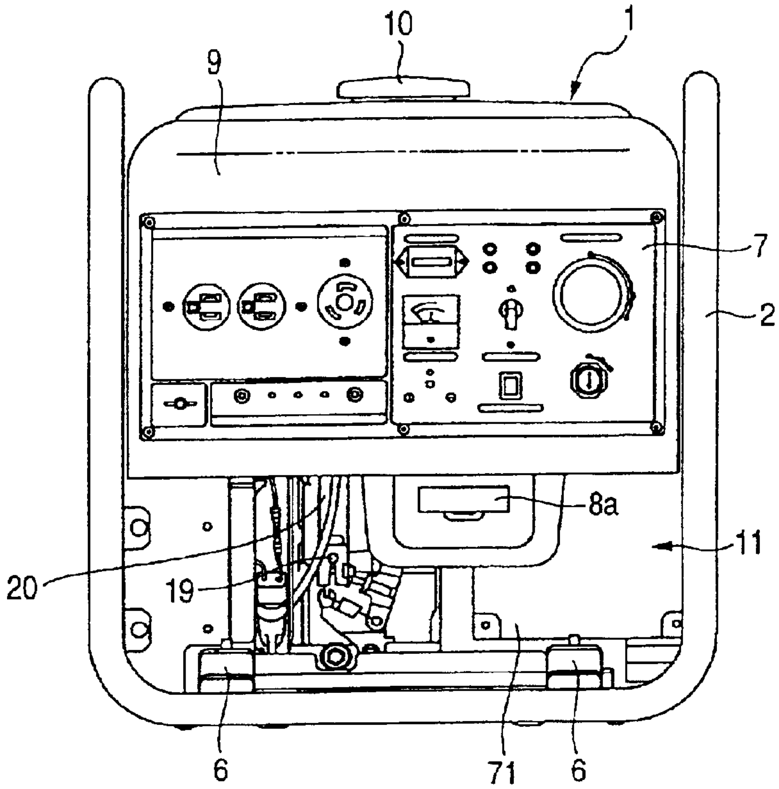
FIG. 1 is a front view showing an engine generator which is an embodiment of the present invention.
Figure 2:
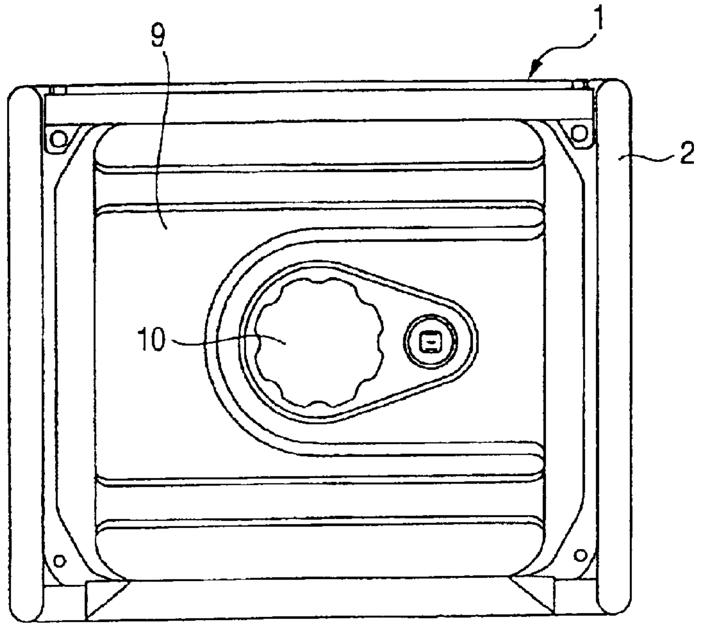
FIG. 2 is a plan view showing the FIG. 1 engine generator.

FIG. 1 is a front view showing an engine generator, which is an embodiment of the invention. FIG. 2 is a plan view showing the FIG. 1 engine generator, and FIG. 3 is a rear view of the same.

Figure 3:
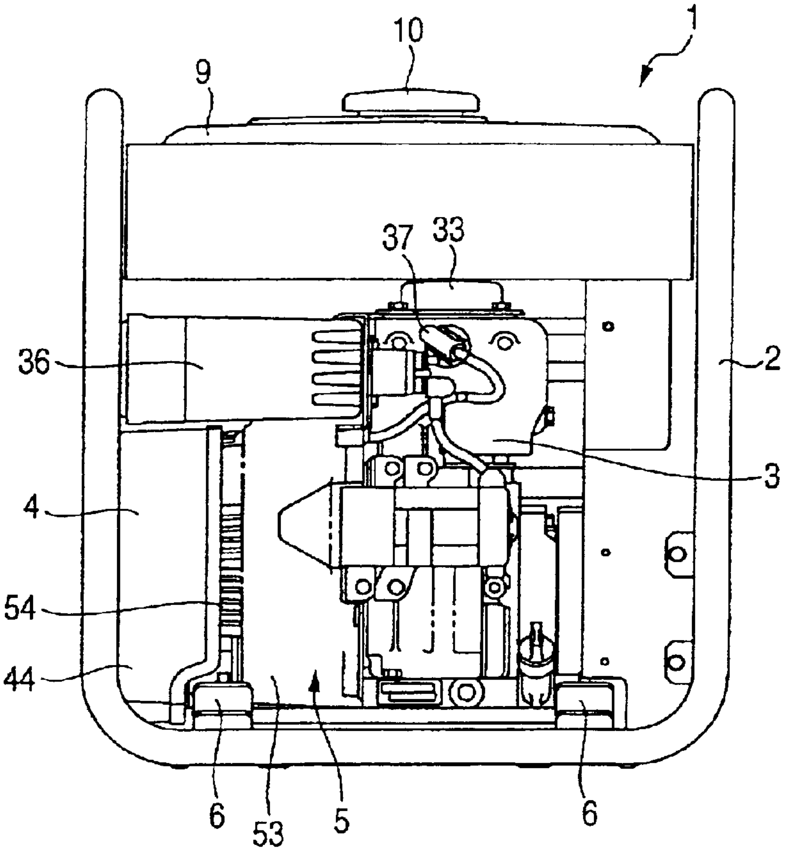
FIG. 3 is a rear view showing the FIG. 1 engine generator.

An engine generator 1 of the embodiment, as shown in FIGS. 1 to 3, is structured such that a generator unit 5 in which an engine 3 serving as a drive source and a power generating body 4 are integrally assembled onto a support frame 2 formed by bending a pipe into a rectangular frame, is elastically supported by a plurality of supporting pieces 6. The engine generator 1 employs an inverter type control system for the control system. An inverter unit 11 for controlling a generated voltage is mounted on the side (rear side in FIG. 3) of the inverter unit 11 (see FIG. 1).

As shown in FIG. 1, a control panel 7 is provided on the front side of the engine generator. The control panel 7 contains various switches, such as an engine switch and an auto throttle switch, and output terminals, such as an AC power source terminal and a DC power source terminal. A recoil knob 8*a* for driving a recoil starter 8 (see FIG. 8) is provided on the lower side of the control panel 7. When the recoil knob is pulled, the engine 3 is turned on.

A fuel tank 9 for storing fuel to be supplied to the engine 3 is provided above the generator unit 5. A fuel supply port is provided at the center part on the upper surface of the fuel tank 9. A fuel cap 10 is attached to the fuel supply port such that it may open and close the fuel supply port.

Figure 4:
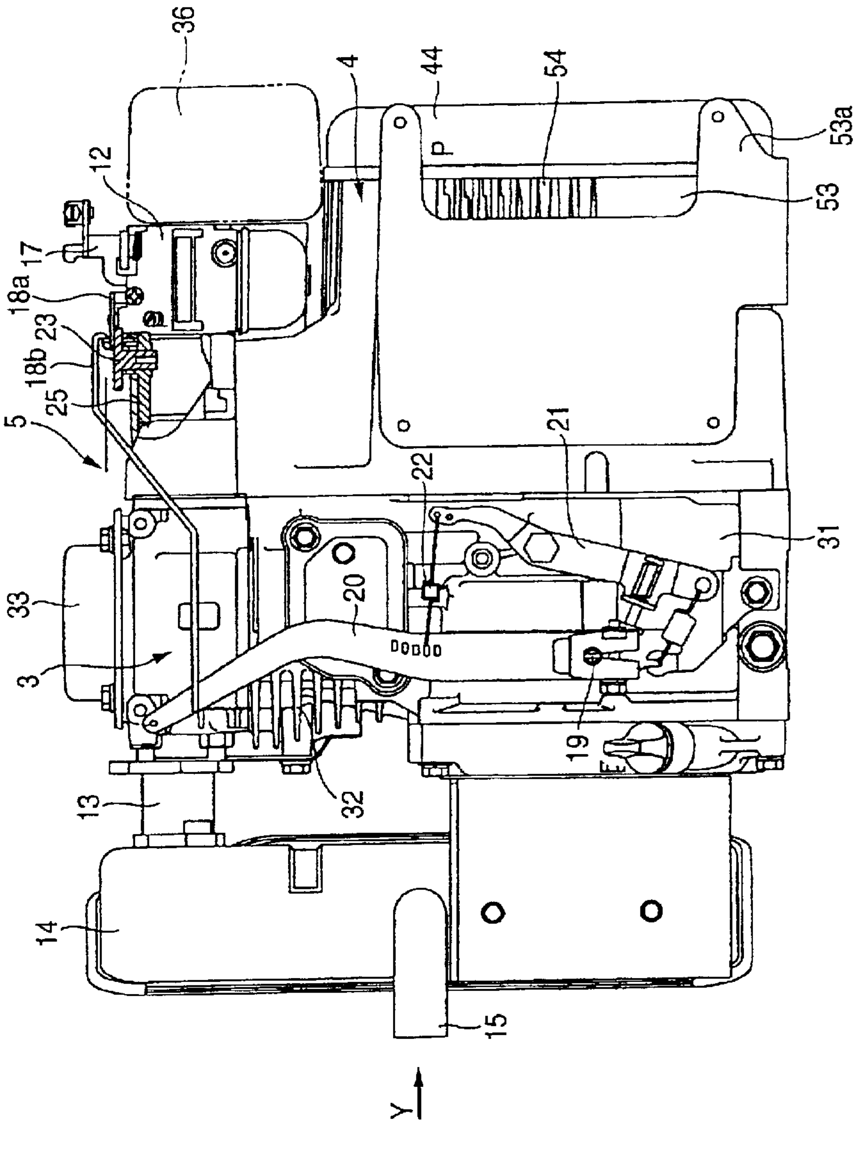
FIG. 4 is a front view showing a generator unit used in the FIG. 1 engine generator.
Figure 5:
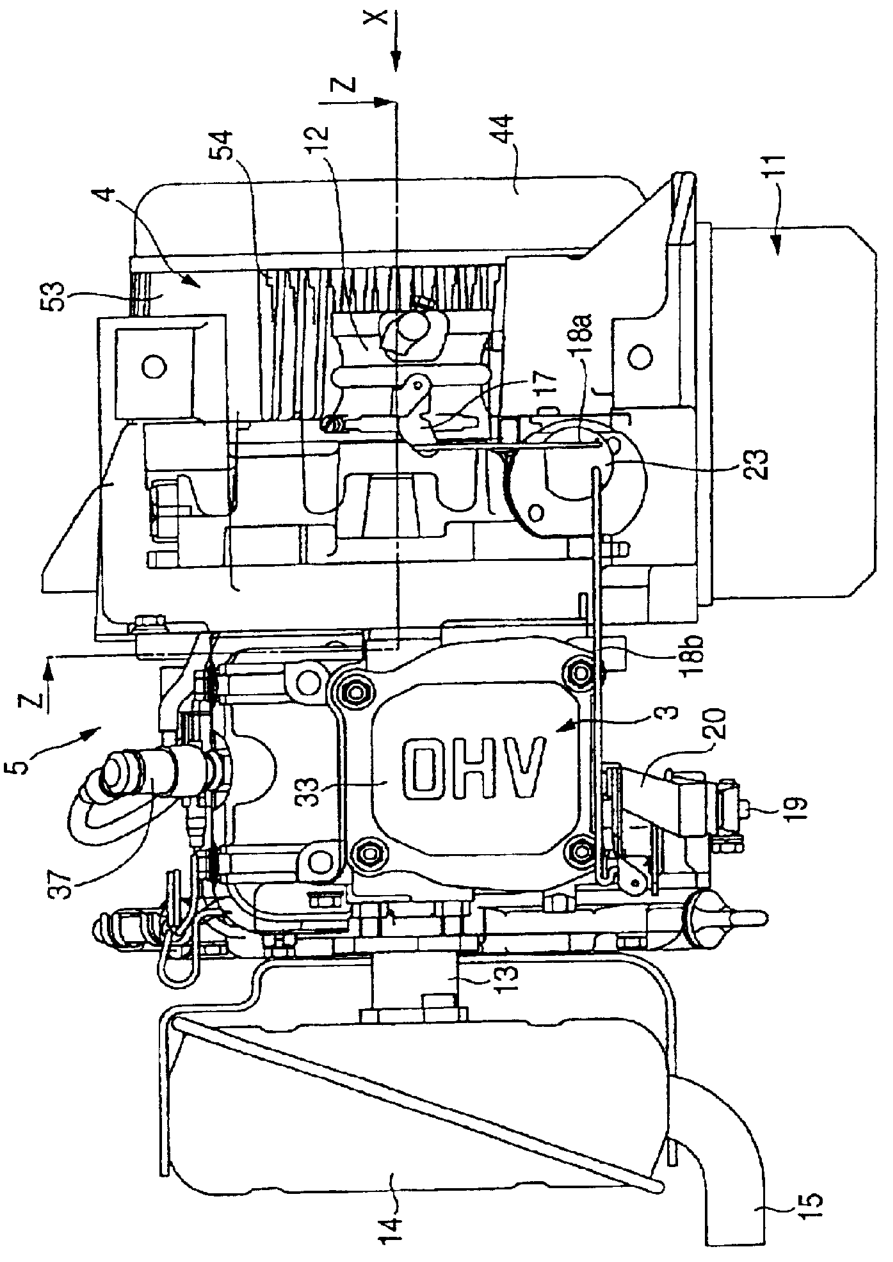
FIG. 5 is a front view showing the FIG. 4 generator unit.
Figure 6:
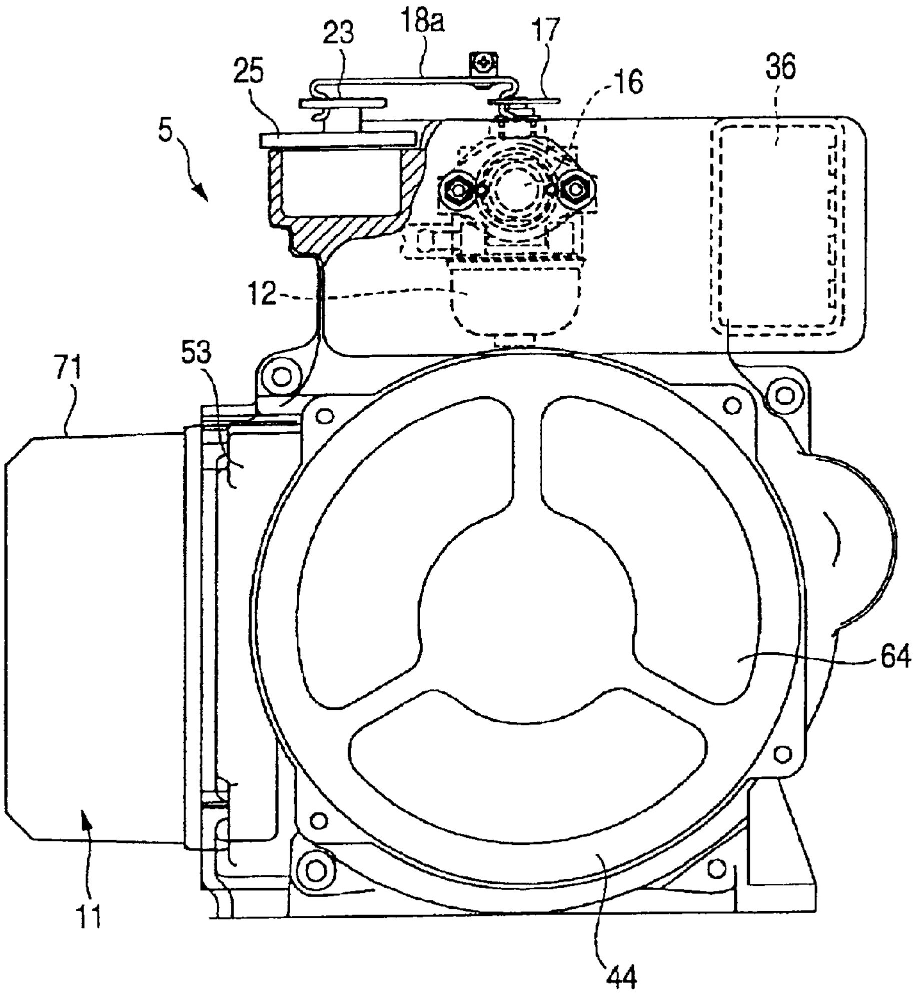
FIG. 6 is a right side view showing the generator unit of FIG. 5 (as seen in the direction of an arrow X)
Figure 7:
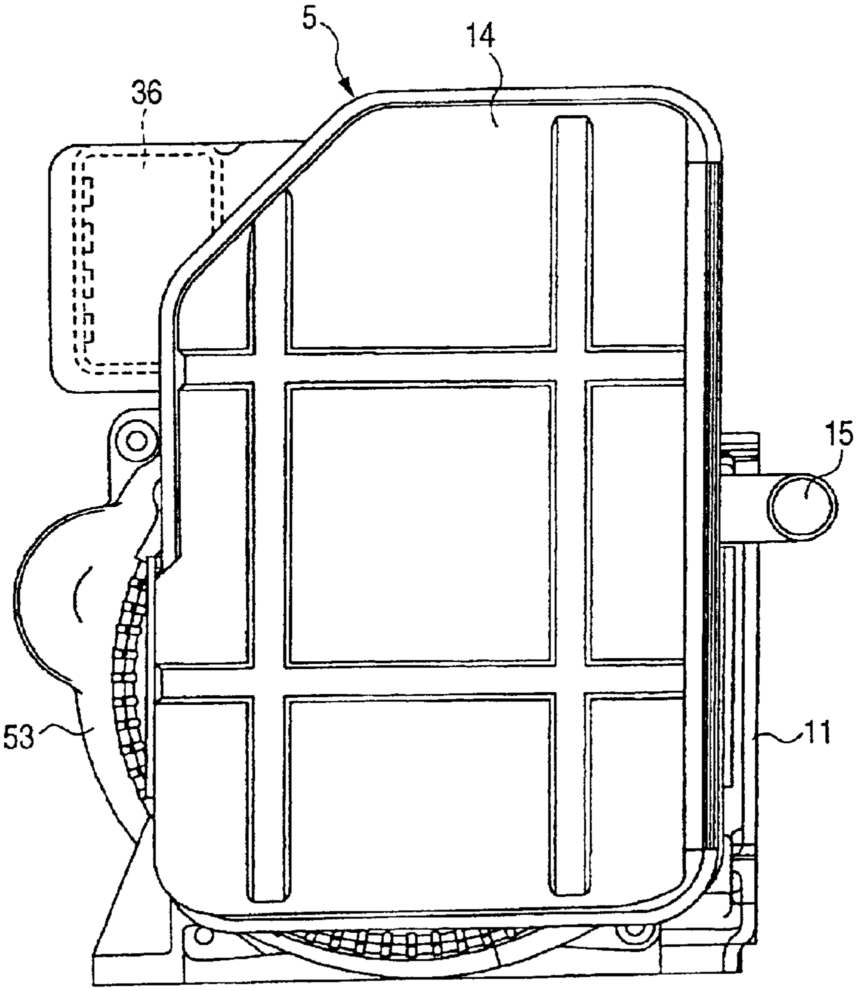
FIG. 7 is a left side view showing the generator unit of FIG. 4 (as seen in the direction of an arrow Y)
Figure 8:
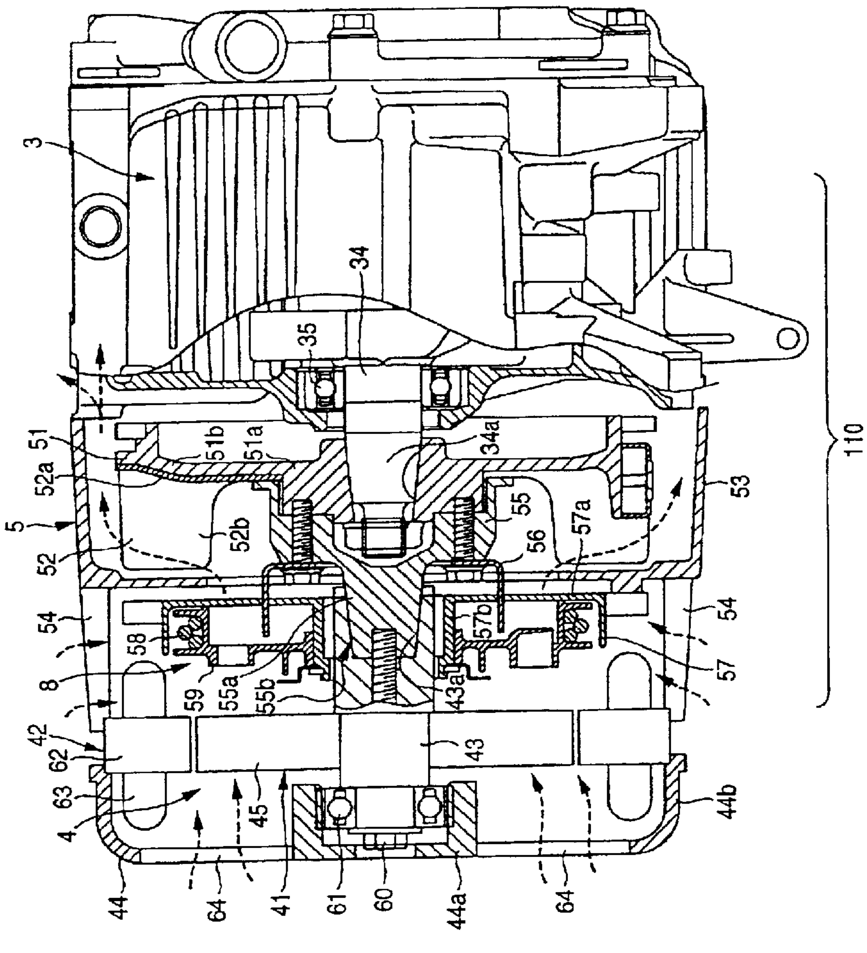
FIG. 8 is a cross sectional view taken on line Z—Z in FIG. 5.

FIG. 4 is a front view showing a generator unit 5 used in the FIG. 1 engine generator; FIG. 5 is a plan view of the same; FIG. 6 is a right side view showing the generator unit of FIG. 5 (as seen in the direction of an arrow X); FIG. 7 is a left side view showing the generator unit of FIG. 4 (as seen in the direction of an arrow Y); FIG. 8 is a cross sectional view taken on line Z—Z in FIG. 5.

In the generator unit 5, the engine 3, the power generating body 4 and the recoil starter 8 are assembled into a single unit. The inverter unit 11 is mounted on the side of the generator unit 5 as shown in FIGS. 4 and 6. The inverter unit 11 converts an electric power output from the power generating body 4 into an AC electric power at a predetermined frequency by controlling the output power. The inverter unit 11 is structured such that electronic circuit boards are mounted within a case 71 made of aluminum, and is directly fixed to a fan cover 53 made of aluminum.

The engine 3 is an air-cooled single cylinder OHV gasoline engine. The engine 3 includes a crank case 31 and a cylinder 32 provided above the crank case 31. A head covert 33 is mounted on the cylinder 32. An ignition coil 37 integral with a plug cap is attached to the cylinder 32. A carburetor 12 is provided on the intake side of the engine 3. Air is introduced through an air cleaner 36 into the carburetor 12 where air is mixed with gasoline to form an air-fuel mixture, and the air-fuel mixture is fed to the engine 3. A muffler 14 is coupled to the exhaust side of the engine through an exhaust pipe 13. An exhaust gas from the engine 3 passes through the muffler 14 and is exhausted outside through an exhaust port 15, which is provided on the left side of the apparatus in FIG. 4.

A throttle valve 16 is provided on the carburetor 12, as shown in FIG. 6. The throttle valve 16 is opened and closed by a carburetor throttle lever 17, which is provided on the upper part of the carburetor 12. One end of a governor rod 18*a* is connected to the carburetor throttle lever 17. The engine speed of the engine 3 is controlled to be constant while being not affected by a load variation, by a mechanical governor.

Specifically, as shown in FIGS. 4 and 5, a governor shaft 19 is rotatably mounted on the crank case 31. The base end of a governor lever 20 is connected to the governor shaft. A tension coil spring 22 coupled with a speed control lever 21 is hooked on the governor lever 20. The governor lever 20 is urged in the clockwise direction in FIG. 5 by the tension coil spring 22. One end of a governor rod 18*b* is coupled to the tip end of the governor lever 20. The other end of the governor rod 18*b* is coupled to a control lever 23. The control lever 23 is rotatably supported on a plate 25, which is mounted on the upper part of the generator unit 5. The other end of the governor rod 18*a* whose one end is coupled to the carburetor throttle lever 17 is coupled to the control lever 23. Accordingly, when the governor lever 20 is turned about the governor shaft 19, the governor rod 18*b*, the control lever 23 and the governor rod 18*a* are moved in an interlocking manner, and the carburetor throttle lever 17 is operated.

In this case, the governor shaft 19 is engaged with a governor sleeve being axially slidably mounted on the shaft, which is driven to rotate by the crank shaft 34 of the engine 3. A rotary body is fastened to the shaft. A plurality of governor arms are rotatably mounted on the end face of the rotary body at positions arrayed radially from the center of the end face. Governor weights are integrally provided on those governor arms, whereby a mechanical governor mechanism is formed.

When a load of the engine 3 varies to be low, the engine speed, i.e., the number of revolutions of the crank shaft 34, will temporarily increase by an amount of the load variation. However, with decrease of the number of revolutions, a centrifugal force acting on the governor weights decreases to close the governor arms. With this, the governor sleeve moves, and the governor shaft 19 rotates to the low speed side. With the rotation of the governor shaft 19, the governor lever 20 also rotates. Its motion is transmitted to the carburetor throttle lever 17, through the governor rod 18*a* and the like, and the throttle valve 16 is driven in the closing direction. As a result, the engine speed is decreased with the load variation. When the engine load varies to be high, the governor lever 20 is rotated in the reverse direction. Accordingly, the engine speed is adjusted to be constant irrespective of the load variation.

In the engine 3, a crank shaft 34 assembled into a crank case 31 is disposed extending in the horizontal directions in FIG. 8. In the generator unit 5, one end of the crank shaft 34 functions as an output shaft of the engine 3. The flywheel 51, cooling fan 52, recoil starter (recoil device) 8 and power generating body 4 are disposed in this order on the output shaft. The flywheel 51 and the cooling fan 52 are mounted at positions subsequent to the engine 3. The recoil starter 8 and the power generating body 4 are disposed at positions located beyond the adapter 55 fastened to the flywheel 51.

One end 34*a* of the crank shaft 34 of the engine 3, as shown in FIG. 8, is supported by a bearing 35 mounted on the crank case 31. The other end of the crank shaft 34 is also supported by a bearing, not shown, located on the opposite side to that, and is rotatable with respect to the crank case 31. One end 34*a* of the crank shaft is protruded out of the crank case 31, and the flywheel 51 for stabilizing the engine output of the engine 3, such as engine speed and torque, is mounted on the one end. The flywheel 51 includes a boss part 51*a* fastened to the crank shaft 34 with the aid of a key, and a disc part 51*b* radially expanding from the boss part 51*a*.

A cooling fan 52 is mounted on the disc part 51*b*. The cooling fan 52 includes a disc part 52*a*, and a number of fan blades 52*b* integrally formed on the surface of the disc part 52*a*. The cooling fan 52 is covered with a fan cover 53 to be fastened to the engine 3. The fan cover 53 is made of aluminum, and includes a number of slits 54 serving as cooling air intake ports, which are formed on the side surface. The fan cover 53 functions as a duct for guiding air. As shown in FIG. 8, with rotation of the cooling fan 52, air is introduced into the fan cover 53 through the slits 54, and fed and guided as cooling air to the engine 3.

A recoil starter 8 is disposed at a position subsequent to the flywheel 51. A recoil ring 56 is mounted on a boss part 51*a* of the flywheel 51, through the adapter 55. A recoil holder 57, integral with the disc part 57*a* and the cylindrical part 57*b*, is disposed at a position subsequent to it. A recoil pulley 59 to be wound thereon with a recoil rope 58 is rotatably mounted on the outside of the cylindrical part 57*b*.

An engaging pawl (not shown) is provided on the recoil pulley 59. When the recoil knob 8*a* is pulled and the recoil pulley 59 is rotated by the recoil rope 58, the engaging pawl is brought into engagement with the recoil ring 56. In turn, the crank shaft 34, coupled therewith through the adapter 55, is rotated to start the operation of the engine 3. A rewind spring, not shown, is provided on the recoil holder 57. A recoil rope 58 is rewound onto the recoil pulley 59 by a spring force thereof.

A power generating body 4 is disposed subsequent to the recoil starter 8. In the engine generator 1, the engine 3, the flywheel 51, the cooling fan 52 and the recoil starter 8 make up a engine unit (engine unit part) 110 for driving the power generating body. The power generating body 4 may be attached thereto, with the help of the adapter 55. In the instant embodiment, the power generating body 4 which employs the inverter control system for the control system is attached to the engine generator. If required, a power generating body of the AVR type to be described later may be used instead.

The power generating body 4 is of the inner rotor type, and contains an inner rotor 41 and a stator 42. The inner rotor 41 is formed with a rotor shaft 43 and a rotor disc 45. The rotor shaft 43 is fastened to the tip of the boss part 55*a* of the adapter 55 by a through bolt 60. A tapered part 55*b* is formed in the boss part 55*a*. The tapered part 55*b* is fit into a tapered hole 43*a* formed in the rotor shaft 43.

The flywheel 51 is directly fastened on the crank shaft 34, as described above. An adapter 55 is mounted on the flywheel 51, and an engine 3 is fastened to the adapter 55. The rotor shaft 43 of the power generating body 4 is coupled to the crank shaft 34 with the aid of the adapter 55. Thus, in the engine generator 1, the flywheel 51 and the power generating body 4 are coupled together by the adapter 55. Therefore, even if the recoil starter 8, the power generating body 4 and the like are disposed on the output shaft side, there is no need of using a long dedicated crank shaft.

Accordingly, the parts may be laid out as shown in FIG. 8 without any alteration of an engine side, e.g., a crank shaft. Accordingly, a general purpose engine may be used without using any dedicated part, and the product cost may be reduced. Since the rotor shaft 43 is fastened by using the adapter 55, a sufficient large diameter of the tapered part is secured. Those may be coupled together at sufficient strength.

The other end of the rotor shaft 43 is rotatably supported by a bearing 61 mounted on the rear cover 44 of the power generating body. The stator 42 is disposed outside the inner rotor 41. In this instance, the stator 42 is held between the fan cover 53 and the rear cover 44.

A plurality of magnets (not shown) are mounted on the outer peripheral surface of the inner rotor 41 in the circumferential direction. A core 62, which is formed of a lamination of a number of copper plates, is provided on the stator 42. The core 62 is wound by a coil 63. With rotation of the crank shaft 34, the magnets of the inner rotor 41 rotate inside the coil 63, whereby a electromotive force is generated in the coil 63, leading to power generation.

A rear cover 44 is formed with a disc part 44*a* having a ventilation hole 64 formed therein and a cylindrical part 44*b* integral with the disc part. The rear cover 44 is fastened at the cylindrical part 44*b* to the fan cover 53. At this time, the stator 42 is held between it and the fan cover 53. And, as shown in FIG. 8, with rotation of the cooling fan 52, air is introduced from the ventilation hole 64 into the rear cover 44, and flows to the engine 3 while cools the stator 42 and the like.

Air also flows into the generator unit 5, through slits 54 formed on the side part of the fan cover 53. The air current joins the cooling air after it is introduced through the ventilation hole 64 and cools the stator 42 and the like, and guided by the fan cover 53 and blows against the periphery of the engine 3. Thus, one cooling fan 52 causes two cooling air currents, one flowing through the slits 54 and the other flowing through the ventilation hole 64, whereby the power generating body 4 and the engine 3 are both cooled. The cooling air made to blow against the engine 3 flows to the rear side of the engine 3 and cools the muffler 14. It is noted that the cooling fan 52 is disposed between the engine 3 and the power generating body 4, as shown in FIG. 8. With this structure, the power generating body 4 is little affected by engine exhaust heat. In this respect, the cooling effect of the power generating body 4 is facilitated.

Figure 9:
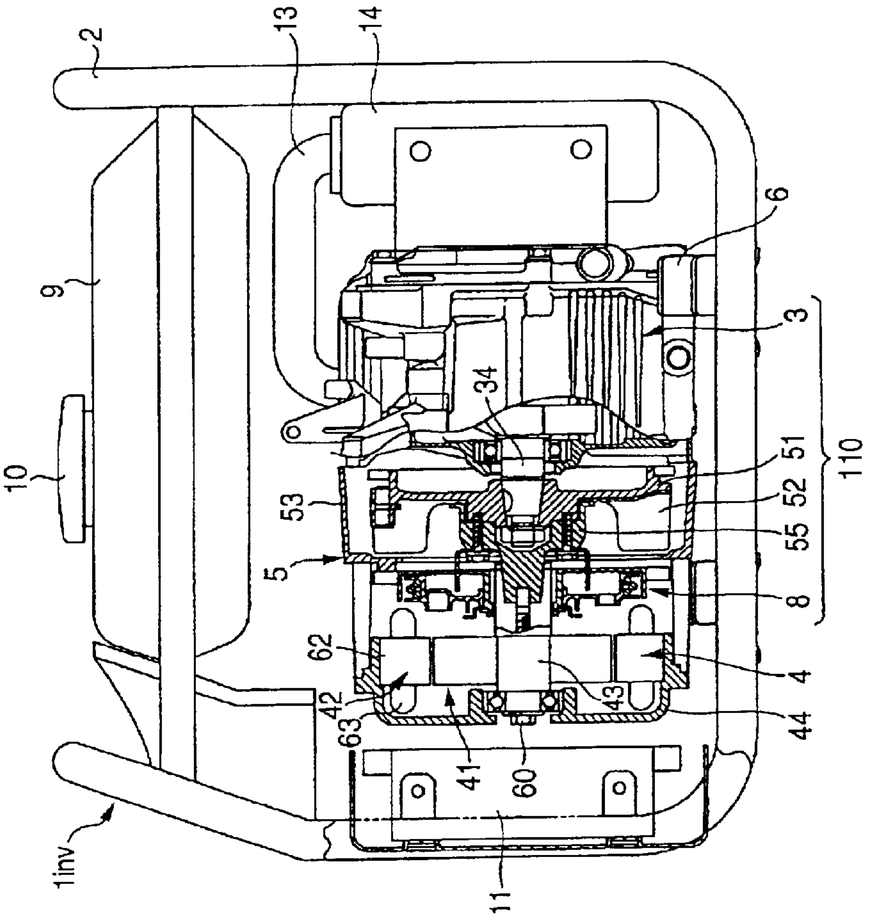
FIG. 9 is an explanatory diagram useful in explaining an engine generator arranged so as to allow a power generating body assembled thereinto to be replaced with another power generating body, the power generating body being of the inverter type.
Figure 10:
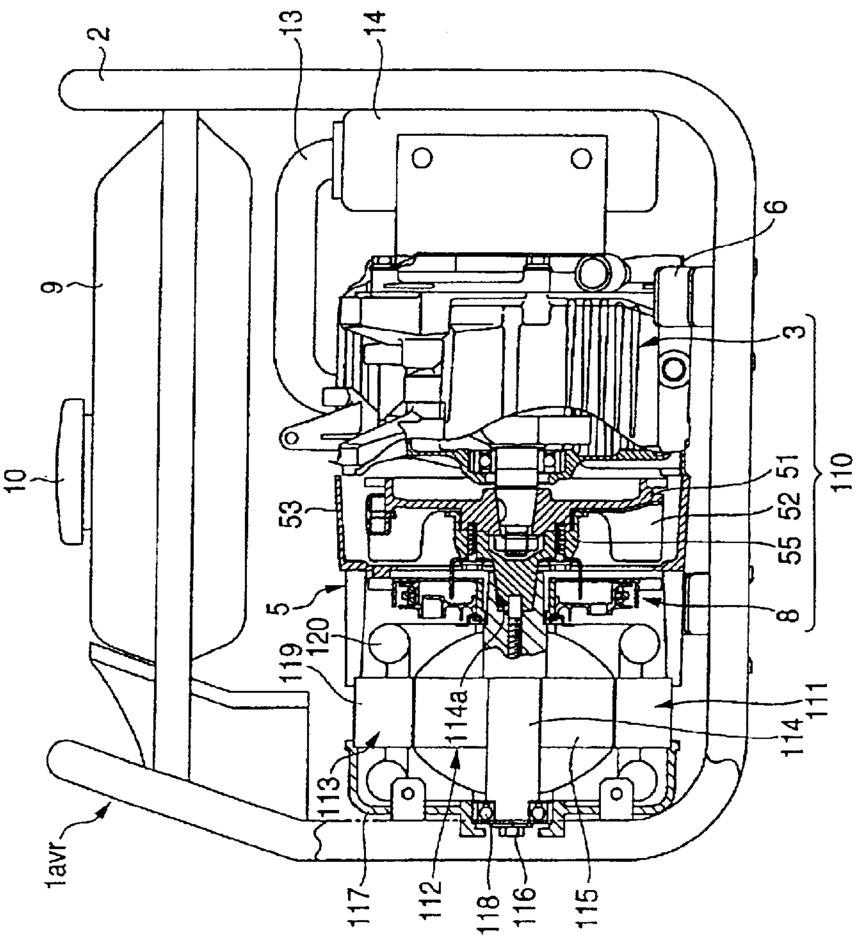
FIG. 10 is an explanatory diagram useful in explaining an engine generator arranged so as to allow a power generating body assembled thereinto to be replaced with another power generating body, the power generating body being of the AVR type.

As described above, in the engine generator of the invention, the power generating body 4 disposed subsequent to the adapter 55 is replaceable, viz., the power generating body based on one control system may be replaced with another power generating body based on another control system, which is different from the former. FIGS. 9 and 10 are explanatory diagrams useful in explaining engine generators each arranged so as to allow the replacement of the power generating body. FIG. 9 shows an engine generator linv attached with an inverter type power generating body. FIG. 10 shows an engine generator lavr attached with an AVR type power generating body. The structure of the FIG. 9 engine generator, except the power generating body, is substantially the same as of the FIG. 10 engine generator. Hence, in those figures, like reference numerals are used for designating like and equivalent portions.

In the FIG. 9 engine generator linv, a power generating body 4 based on the inverter control system is attached to the engine unit 110. A length of the engine generator linv as viewed in the crank shaft 34 direction is slightly longer than that of the engine generator 1 already stated. The inverter unit 11 is disposed at the left side part of the generator unit 5 in the drawing. Other structure than this is substantially the same as of the already stated one.

In the FIG. 10 engine generator lavr, an AVR type power generating body 111 is attached to the engine unit 110. The power generating body 111, like the power generating body 4, is also of the inner rotor type, and contains an inner rotor 112 and a stator 113. The inner rotor 112 is formed with a rotor shaft 114 and a rotor disc 115. The rotor shaft 114 is fastened to the tip of the boss part 55*a* of the adapter 55 by a through bolt 116. A tapered hole 114*a* is formed also in the rotor shaft 114, and is to be fit to the tapered part 55*b*.

The other end of the rotor shaft 114 is rotatably supported by a bearing 118 mounted on a generator rear cover 117. The stator 113 is disposed outside the inner rotor 112. The stator 113 is held between the fan cover 53 and the generator rear cover 117. Magnets (not shown) are mounted on the outer peripheral surface of the inner rotor 112 in the circumferential direction. In the stator 113, a coil 120 is wound on a coil 119. To comply with common specifications, the outside diameter of the stator 113 is selected to be equal to that of the stator 42. The entire length of the power generating body 111 is substantially equal to the corresponding one in the case where the power generating body 4 and the inverter unit 11 are both used.

To change the engine generator lavr originally attached with the AVR type power generating body 111 as shown in FIG. 10 to the engine generator using the inverter type power generating body, the following replacing procedure is taken. To start with, the through bolt 116 is removed, and the power generating body 111 is taken out of the engine unit 110. Then, the adapter 55 of the engine unit 110 appears or is open to the view.

Subsequently, the power generating body 4 is attached to the engine unit 110. Since the stator 113 and the stator 42 are equal in outside diameter as described above, either of those stators may be attached to the fan cover 53. And, the stator 42 is mounted onto between the fan cover 53 and the rear cover 44, and the power generating body 4 is fastened to the adapter 55. Thereafter, the inverter unit 11 is attached to the structure, an engine generator linv is completed in structure, and here the replacing work of the power generating body ends.

Thus, in the engine generator 1, the generator unit 5 is divided into two sections, the engine unit 110 and the power generating body 4 (111), and those sections are interconnected by the adapter 55. The engine unit 110 contains the engine 3, and the flywheel 51 and the cooling fan 52, and further the recoil starter 8 by use of the adapter 55. The rotor shaft 43 (115) of the power generating body 4 (111) is fastened to the adapter 55, and the stator 42 (113) equalized in outside diameter is fastened to the fan cover 53 by use of the rear cover 44 (117).

In this way, the power generating body 4 (111) may be replaced with the power generating body 111 (4) by a simple replacing work, e.g., simple work of removing bolts. The FIG. 9 engine generator linv may be replaced with the FIG. 10 engine generator lavr. In a specific situation, the engine generators of the AVR type are manufactured as the standard specification. The engine generators of the inverter type are stocked in shops and the like. When a customer desires to buy the engine generator of the inverter type, the AVR type power generating body is changed to the inverter type one, viz., the product specifications are changed according to the customer's desire. Therefore, there is no need for the alternative manufacturing and purchasing, and the invention succeeds in eliminating the excessive stock or shortage of merchandize in stock.

While there has been described in connection with the preferred embodiments of the present invention, it will be obvious to those skilled in the art that various changes and modifications may be made therein without departing from the present invention, and it is aimed, therefore, to cover in the appended claim all such changes and modifications as fall within the true spirit and scope of the present invention.

As seen from the foregoing description, an adapter to which the power generating body is detachably attached for its replacement is provided between the drive unit part and the power generating body. This feature enables one to replace the power generating body with another power generating body by a simple replacing work. Accordingly, one can replace the power generating body with another power generating body, and change the product specifications to other ones. A power generating body based on a control system which is different from a control system of an existing power generating body is allowed to be attached to the drive unit part with the aid of the adapter. Therefore, in a specific example, one can replace a power generating body of the AVR type with another power generating body of the inverter type. Accordingly, there is no need for the alternative manufacturing and purchasing, and the invention succeeds in eliminating the excessive stock or shortage of merchandise in stock.

In addition to this, as seen from the foregoing description, a flywheel, a cooling fan, a recoil starter, and a power generating body are disposed in this order from the engine. The power generating body and the engine are both cooled by use of one cooling fan.

What is claimed is:

1. An engine generator comprising:

an engine unit part having an engine, a flywheel, a cooling fan driven by said engine, and a recoil device for starting up said engine;

a power generating body comprising a rotor shaft mounted on said engine unit part and driven by said engine; and an adapter disposed between said engine unit and said power generating body, wherein said rotor shaft of said power generating body is detachably attached to said adapter to allow replacement of the power generating body, and wherein said flywheel, said cooling fan, said recoil device and said power generating body are disposed on the side of the engine having an output shaft, and arranged in this order from said engine.

2. The engine generator according to claim 1, wherein said flywheel is mounted on said output shaft, said cooling fan is mounted on said flywheel, and said recoil device is mounted on said flywheel through said adapter.

3. The engine generator according to claim 2, wherein said power generating body is mounted to said adapter.

4. The engine generator according to claim 3, wherein said power generating body is of an inner rotor type.

5. An engine generator comprising:

an engine;

a power generating body driven by said engine, a flywheel, a cooling fan driven by said engine, and a recoil device for starting up said engine, wherein said engine, said flywheel, said cooling fan, said recoil device and said power generating body are disposed on the side of the engine generator having an output shaft, and arranged in this order from said engine.

6. The engine generator according to claim 5, further comprising:

an adapter disposed between said engine unit and said power generating body, wherein said power generating body is detachably attached to said adapter to allow replacement of the power generating body.

7. The engine generator according to claim 6, wherein the output shaft is a tip end of a crank shaft of said engine.

8. The engine generator according to claim 7, wherein said adapter has a common mounting portion to which a plurality of power generating bodies are singularly mountable, said plurality of power generating bodies having control systems different from one other.

9. The engine generator according to claim 8, wherein the control systems of said power generating body includes an automatic voltage regulator type and an inverter type.

10. An engine generator comprising:

an engine unit part having an engine;

a power generating body comprising a rotor shaft mounted on said engine unit part and driven by said engine; and an adapter, which includes a boss part and a tapered part formed in said boss part, disposed between said engine unit and said power generating body, wherein said rotor shaft of said power generating body is detachably attached to said adapter to allow replacement of the power generating body, and wherein said rotor shalt includes a tapered hole, and said tapered part of said adapter fits inside said tapered hole of said rotor shaft.

11. An engine generator comprising:

an engine unit part having an engine;

a power generating body comprising a rotor shaft mounted on said engine unit part and driven by said engine; and an adapter, which includes a boss part and a tapered part formed in said boss part, disposed between said engine unit and said power generating body, wherein said rotor shaft of said power generating body is detachably attached to said adapter to allow replacement of the power generating body, and wherein said rotor shaft is fastened to said boss part of said adapter with a bolt.

12. The engine generator according to claim 1, wherein said flywheel includes a boss part and a disc part.

13. The engine generator according to claim 12, wherein said cooling fan is mounted on said disc part of said flywheel.

14. The engine generator according to claim 12, wherein said recoil starter is mounted on said boss part of said flywheel.

* * * * *